US006393180B1

(12) United States Patent
Farries et al.

(10) Patent No.: US 6,393,180 B1
(45) Date of Patent: May 21, 2002

(54) PROVIDING A REFRACTIVE INDEX CHANGE IN AN ION DIFFUSED MATERIAL

(75) Inventors: Mark Farries, Nepean; Barrie Keyworth, Ottawa, both of (CA); Jan Ingenhoff; Norbert Fabricius, both of Waghäusel-Kirrlach (DE)

(73) Assignee: JDS Fitel Inc., Nepean (CA)

( * ) Notice: Subject to any disclaimer, the term of this patent is extended or adjusted under 35 U.S.C. 154(b) by 0 days.

(21) Appl. No.: 09/204,148

(22) Filed: Dec. 3, 1998

(51) Int. Cl.⁷ .................................................. G02B 6/34
(52) U.S. Cl. .................... 385/37; 385/123; 385/129; 385/130; 65/400
(58) Field of Search ................... 385/37, 129–132, 385/123, 124; 65/392, 393, 400; 359/568, 571, 572, 573, 575

(56) References Cited

U.S. PATENT DOCUMENTS

| 4,022,602 A | * | 5/1977 | Pavlopoulos | 65/392 |
| 4,093,339 A | * | 6/1978 | Cross | 385/37 |
| 4,747,654 A | * | 5/1988 | Yi-Yan | 385/37 |
| 4,963,177 A | * | 10/1990 | Najafi et al. | 385/37 |
| 5,675,691 A | * | 10/1997 | Edlinger et al. | 385/130 |
| 5,930,420 A | * | 7/1999 | Atkins et al. | 385/37 |
| 5,940,568 A | * | 8/1999 | Losch | 385/129 |
| 5,949,943 A | * | 9/1999 | Watanabe et al. | 385/129 |
| 6,067,388 A | * | 5/2000 | Fabricius et al. | 385/14 |
| 6,115,518 A | * | 9/2000 | Clapp | 385/37 |

FOREIGN PATENT DOCUMENTS

WO    WO 00/29881    *    5/2000

OTHER PUBLICATIONS

Kashyap et al, "Laser–Trimmed Four Port Bandpass Filter Fabricated in Single–Mode Photosensitive Ge–Doped Planner Waveguide", IEEE Photonics Technology Letters, vol. 5, No. 2, 02/1993.*
Raman Kashyap in "Fiber Bragg Gratings", Academic Press, Toronto, 1999, pp. 13–44.

* cited by examiner

*Primary Examiner*—Hemang Sanghavi
(74) *Attorney, Agent, or Firm*—Lacasse & Associates; Randy W. Lacasse; Kevin E. Greene

(57) ABSTRACT

A method of forming a grating in waveguide uses an ion exchange process to provide a waveguide region within and clad by a surrounding substrate and through an ion exchange process diffusing into the substrate an ion, such as such as Ag+, that is photosensitive and that provides a refractive index difference from adjacent non-diffused regions of the substrate. After the diffusion process, the step of exposing at least some of the waveguide region to light having a suitable intensity and duration to provide a permanent index change within regions of the waveguide region to form a grating is performed.

11 Claims, No Drawings

PROVIDING A REFRACTIVE INDEX CHANGE IN AN ION DIFFUSED MATERIAL

FIELD OF THE INVENTION

This invention relates generally to producing optical waveguides by ion exchange; and, in one preferred embodiment relates to producing an optical waveguide having a grating impressed therein.

BACKGROUND OF THE INVENTION

Interest in the use of ion-exchanged glass waveguides for integrated optics has increased considerably recently, since the operation of optical glass waveguides is passive and does not allow adjustment after production. To produce optical fiber compatible waveguide devices by an ion exchange technique, two-step processes are generally used. In these processes, waveguides are formed by the exchange of the original ions in the glass (typically sodium ions Na+) to ions increasing the refractive index (such as K+, Ag+, Cs+, Rb+, Li+ or Tl+ ions) through a narrow opening in the ion exchange mask, and by using salt melts or a silver film as an ion source. In the second step, thermal treatment or ion exchange in an $NaNO_3$ melt modifies the refractive index profile of the waveguide to obtain better coupling to an optical fibre. A description of the basic principles of ion exchange are found in an article entitled *Ion-Exchanged Glass Waveguides: A Review*, R. V. Ramaswamy, Journal of Lightwave Technology, Vol. 6, No. 6, June 1988, P. 984.

An early teaching of making waveguides in a substrate is found in U.S. Pat. No. 4,793,675 in the name of Handa, assigned to Canon Kabushiki Kaisha of Japan. Handa discloses a method of making a element having a light waveguide in which the input-output area through which light is input or output is made into a light waveguide of a high threshold value of optical damage formed by outside diffusion of lithium oxide or by ion exchange.

Further work in the field of producing optical waveguides by ion exchange on a glass substrate can be found in U.S. Pat. No. 5,160,523 in the name of Honkanen et al. assigned to Oy Nokia AB, of Helsinki Finland, issued Nov. 3, 1992. In this disclosure, in order to alleviate the tolerances allowed for the ion exchange technique, the waveguides are formed in the invention by diffusing ions which increase the refractive index away from a waveguide formed previously on the glass substrate and being wider than the optical waveguides to be produced by using the ion exchange technique and a positive type ion exchange mask.

As with optical fibres, there is increasing interest in fabricating devices within a monolithic block of glass, comprising optical waveguides; however this has continued to be difficult. A process has recently been disclosed by Nippon Sheet Glass Co., Ltd. of Japan that relates to fabricating a grating on glass using laser machining. A diffusion process is first performed wherein molten salt comprising $AgNO_3+NaNO_3$ is diffused at a temperature of 300 degrees Celsius for a duration ranging from 1 minute to 80 hours in air. Laser machining is later performed using a phase mask to etch a grating within the material. Laser ablation results in regions wherein the waveguide material is etched away creating index differences between ablated regions consisting of air, and the adjacent unablated material interfaces.

In accordance with one aspect of this invention, a method is described of providing a grating within a monolithic waveguide, by first performing an ion exchange process, wherein, for example Na+ ions are exchanged with Ag+ ions to provide a waveguide within glass or another substrate material. According to known techniques of writing or impressing optical gratings in germanium doped optical fibre, as are described in U.S. Pat. No. 5,327,515, 5,104,209, 5,216,739, 4,725,110, and, 4,800,950 we have discovered that a grating can be impressed by, for example interfering two beams within the Ag+ ion exchanged waveguide.

In a preferred embodiment, prior to the ion exchange process, the material to be used is comprised as follows:

| Compound | Mol % | Gw % |
|---|---|---|
| $SIO_2$ | 62.90 | 56.54 |
| $B_2O_3$ | 12.00 | 12.50 |
| $Na_2O$ | 12.50 | 11.57 |
| $Al_2O_3$ | 12.50 | 19.06 |
| $AS_2O_3$ | 0.10 | 0.29 |
| F– | 6.30 | 4.56 |

In accordance with a broad aspect of the invention, permanent refractive index changes in the form of a Bragg grating is provided within a substrate having an ion diffused waveguide formed therein. The waveguide comprises a material, i.e. Ag+ that is photosensitive. The diffused ion in the preferred embodiment is Ag+ however other photosensitive ions may be used. Preferably, the Bragg grating is formed by interfering two light beams within the waveguide region using known techniques. Heretofore, the writing of such a grating has been performed in an optical fibre having a germanium doped light sensitive core.

Heretofore, providing a grating in an ion-diffused waveguide has been a complex process of etching or ablating the portions of the waveguide region with a high power laser.

In another embodiment of the invention, the ion-diffused material, for example glass having Na+ diffused therein, may be exposed to a light beam of suitable intensity and duration within the diffused region so as to vary the index within the ion diffused material to effect a waveguide therein. Here, a focused laser beam can be used to effect a positive index change, increasing the refractive index within the irradiated region.

What is claimed is:

1. A method of forming a grating in a waveguide, comprising the steps of:
   providing a waveguide region within and entirely clad by a surrounding substrate through an ion exchange process by diffusing into the substrate an ion that provides a refractive index different from a adjacent non-diffused regions of the substrate;
   exposing at least some of the waveguide region to light having a suitable wavelength, intensity and duration to provide a permanent index change within regions of the waveguide region to form a grating.

2. A method of forming a grating in a waveguide, comprising the steps of:
   providing an ion diffused waveguide region within a substrate;

exposing the ion diffused waveguide region to light by interfering two beams within the ion diffused waveguide region.

3. A method as defined in claim 1 wherein the ion diffused within the substrate to form the waveguide region is Ag+.

4. A method as defined in claim 2 wherein the ion diffused within the substrate to form the waveguide region is Ag+.

5. A method as defined in claim 1, wherein a mask is used between a light source and the substrate.

6. A method as defined in claim 5, wherein the mask is a phase mask for splitting a beam incident thereon into a plurality of beams.

7. A method as defined in claim 6, wherein at least two of the plurality of beams are interefered within the waveguide region.

8. A method of producing a refractive index change in a light transmissive substrate comprising the steps of:

performing an ion exchange process on the light transmissive substrate to form a waveguide therein that is photosensitive to light having a suitable wavelength, intensity and duration; and, exposing a portion of the waveguide to light having the suitable wavelength, intensity and duration to provide a permanent index change within the exposed portion.

9. A method as defined in claim 8, wherein the ion diffused region is diffused with Ag+.

10. A method as defined in claim 8, wherein a waveguide is provided within the ion diffused region by irradiating said region with a focused laser beam.

11. A method as defined in claim 8, wherein the ion diffused region comprises ions of Ag+ diffused therein and wherein the permanent index change after irradiating said region is a positive index change having a refractive index that is higher than the refractive index of a non-irradiated region.

* * * * *